US011486969B2

(12) United States Patent
Robert et al.

(10) Patent No.: US 11,486,969 B2
(45) Date of Patent: Nov. 1, 2022

(54) PROTECTION OF A MONOSTATIC OR QUASI-MONOSTATIC LASER RANGEFINDER

(71) Applicant: SAFRAN ELECTRONICS & DEFENSE, Paris (FR)

(72) Inventors: Patrick Robert, Boulogne-Billancourt (FR); Vincent Marie, Boulogne-Billancourt (FR)

(73) Assignee: SAFRAN ELECTRONICS & DEFENSE, Paris (FR)

(*) Notice: Subject to any disclaimer, the term of this patent is extended or adjusted under 35 U.S.C. 154(b) by 337 days.

(21) Appl. No.: 16/766,597

(22) PCT Filed: Nov. 16, 2018

(86) PCT No.: PCT/FR2018/052864
§ 371 (c)(1),
(2) Date: May 22, 2020

(87) PCT Pub. No.: WO2019/102112
PCT Pub. Date: May 31, 2019

(65) Prior Publication Data
US 2021/0364602 A1 Nov. 25, 2021

(30) Foreign Application Priority Data
Nov. 24, 2017 (FR) .................................... 1701233

(51) Int. Cl.
G01S 7/481 (2006.01)
G01S 17/08 (2006.01)

(52) U.S. Cl.
CPC ............ *G01S 7/4813* (2013.01); *G01S 7/481* (2013.01); *G01S 7/4814* (2013.01); *G01S 17/08* (2013.01)

(58) Field of Classification Search
CPC ...... G01S 7/4814; G01S 7/4813; G01S 17/08; G01S 7/481; G02B 3/08; G01C 15/002
See application file for complete search history.

(56) References Cited

U.S. PATENT DOCUMENTS

| 3,424,516 A | 1/1969 | Snyder |
| 7,345,743 B1 | 3/2008 | Hartman et al. |
| 10,048,379 B2 | 8/2018 | Markendorf et al. |
| 10,198,639 B2 * | 2/2019 | Sung ................. H04N 5/23238 |

(Continued)

FOREIGN PATENT DOCUMENTS

| CN | 102278974 A | 12/2011 |
| CN | 105452806 A | 3/2016 |
| EP | 0703481 A1 | 3/1996 |

OTHER PUBLICATIONS

International Patent Application No. PCT/FR2018/052864, International Search Report and Written Opinion dated Mar. 18, 2019, 11 pgs.

(Continued)

*Primary Examiner* — Tsion B Owens
(74) *Attorney, Agent, or Firm* — Lathrop GPM LLP

(57) ABSTRACT

An optical module (10) is attached in front of an optical outlet (21) of a monostatic or quasi-monostatic laser rangefinder (20), for the purpose of transversely offsetting a laser beam of primary radiation (F) emitted by the optical outlet. In this manner, the risk of damage to an optical sensor (23) of the rangefinder can be avoided.

14 Claims, 5 Drawing Sheets

(56) References Cited

U.S. PATENT DOCUMENTS

| | | | |
|---|---|---|---|
| 10,816,649 B1 * | 10/2020 | Keyser | G01J 4/02 |
| 11,175,388 B1 * | 11/2021 | Wood | G01S 17/34 |
| 11,228,370 B2 * | 1/2022 | Danesh | H04B 10/1129 |
| 2020/0389232 A1 * | 12/2020 | Danesh | H04B 10/118 |

OTHER PUBLICATIONS

"LTSD-4 Laser Rangefinder/Designator," Jun. 16, 2017 (Jun. 16, 2017). Retrieved from Internet: https://www.pofvus.info/en/products-and-services/designators-and-rangefinders/716443/; [retrieved on Aug. 1, 2018]; XP055496899.

* cited by examiner

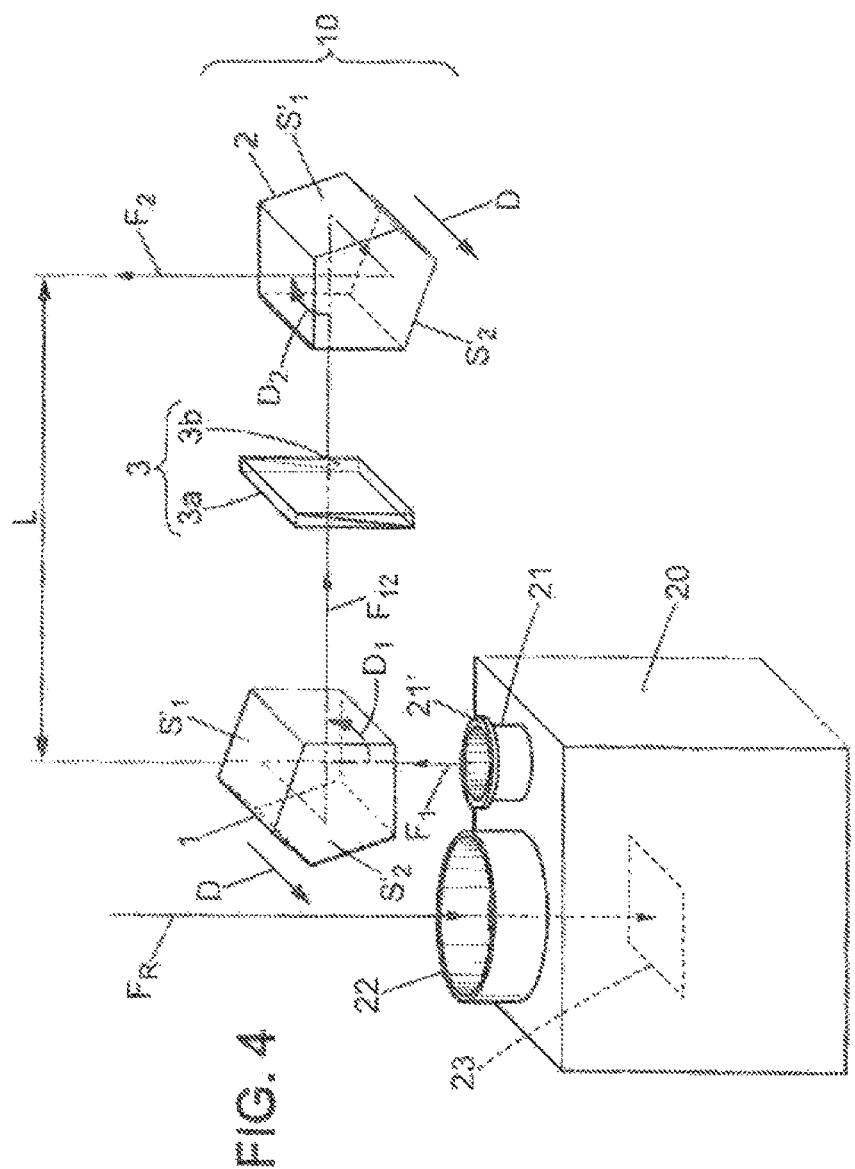

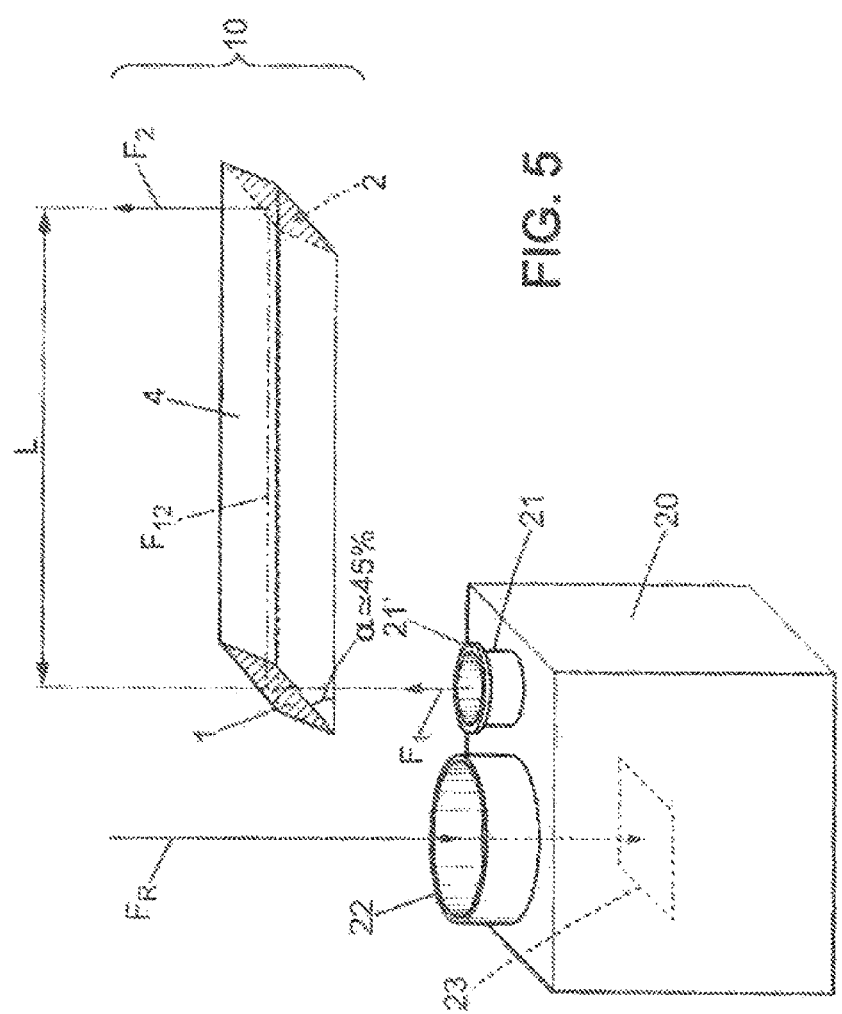

PROTECTION OF A MONOSTATIC OR QUASI-MONOSTATIC LASER RANGEFINDER

CROSS-REFERENCE TO RELATED APPLICATIONS

This application is a 35 U.S.C. § 371 filing of International Application No. PCT/FR2018/052864 filed Nov. 16, 2018, which claims the benefit of priority to French Patent Application No. 1701233 filed Nov. 24, 2017, each of which is incorporated herein by reference in its entirety.

The present invention relates to a method for protecting a monostatic or quasi-monostatic laser rangefinder by adding an optical module to the rangefinder, in front of its optical outlet. It also relates to the rangefinder assembly so formed.

Laser rangefinders are distance measuring devices which emit a radiation laser beam, called the primary radiation, and which collect a portion of this radiation, called the return radiation, which has been backscattered or retroreflected by a target distant from the rangefinder. Determination of the time of propagation of the radiation between the rangefinder and the target, summed for the outward and return propagation paths, provides a measurement of the distance of the target from the rangefinder. In general, such a rangefinder therefore has an optical outlet for emitting the primary radiation laser beam, and an optical inlet for collecting a portion of the return radiation.

Three types of rangefinders are commonly distinguished, according to the distance separating an optical center of an emission pupil that is associated with the optical outlet, and an optical center of a reception pupil that is associated with the optical inlet. This separation distance is called the center-to-center distance between the emission and reception pupils, and the three types of rangefinders are:

- monostatic rangefinders, for which the center-to-center distance between the emission and reception pupils is zero;
- quasi-monostatic rangefinders, for which the center-to-center distance between the emission and reception pupils is less than or equal to 100 mm (millimeters); and
- bistatic rangefinders, for which the center-to-center distance between the emission and reception pupils is greater than 100 mm.

FIGS. 1a to 1c illustrate these three types of rangefinders: FIG. 1a for a monostatic rangefinder, FIG. 1b for a quasi-monostatic rangefinder, and FIG. 1c for a bistatic rangefinder. In these figures, the reference $PU_{21}$ designates the exit pupil of the rangefinder, also called the emission pupil, and the reference $PU_{22}$ designates the entrance pupil of the rangefinder, also called the reception pupil.

Among these laser rangefinders, the monostatic or quasi-monostatic ones are used for many applications, because they are easy to implement and transport. Indeed, for a monostatic or quasi-monostatic rangefinder, the optical inlet and outlet are superimposed or juxtaposed, and the rangefinder is designed so that the direction of propagation of the primary radiation emitted by the optical outlet is identical to the direction of propagation of the portion of the return radiation which is collected during a measurement operation of the rangefinder, these directions of propagation being opposite to one another. Thus, a monostatic or quasi-monostatic rangefinder can consist of a single unit which integrates all the radiation emission and reception components. In contrast to monostatic or quasi-monostatic rangefinders, bistatic rangefinders are composed of a primary radiation emission unit and a reception unit for receiving a portion of the return radiation, these being separate. The use of a bistatic rangefinder thus requires precisely characterizing the relative positions of the two units, and orienting the direction of emission of the primary radiation and the direction of collection of the return radiation so that these two directions intersect substantially at the target.

The present invention is therefore limited to the field of monostatic or quasi-monostatic laser rangefinders, in other words laser rangefinders for which the optical outlet and optical inlet are juxtaposed or superimposed with a center-to-center distance between emission and reception pupils that is zero or less than or equal to 100 mm.

In general, the power of the portion of the return radiation that is collected through the optical inlet of the rangefinder is much less than the intensity of the primary radiation laser beam emitted by its optical outlet. Indeed, in most situations when using a monostatic or quasi-monostatic laser rangefinder, the target causes significant absorption of the primary radiation, and/or reflects this primary radiation with a significant angular broadening of the beam. The optical sensor within the rangefinder, which is dedicated to detecting the return radiation, then has a high sensitivity which is suitable for these most common operating conditions where the radiation to be detected is much less intense than the radiation that is emitted.

However, there are particular situations of use in which the target retroreflects a large portion of the primary radiation, along a direction of propagation of the reflected radiation which is identical to that of the primary radiation but with an orientation of the direction of propagation of the return radiation which is opposite to that of the primary radiation. This is the particular case when the target is a metal reflector with three faces arranged to form a cube corner. The power of the portion of the return radiation that is collected by the optical inlet of the monostatic or quasi-monostatic laser rangefinder is then greater than the tolerance limit of the optical sensor of the rangefinder, so the sensor is then damaged or destroyed.

In practice, the high sensitivity of the rangefinder sensor which is necessary for the most common operating conditions, is the opposite with a tolerance limit that is also high for this optical sensor.

Based on this, a first object of the invention is to provide a protection that is able to protect a monostatic or quasi-monostatic laser rangefinder from damage caused by the particular situations just described.

An additional object is to provide such protection that is small, inexpensive, and does not increase the complexity of using a monostatic or quasi-monostatic laser rangefinder.

To achieve at least one of these objects, a first aspect of the invention provides a method for protecting a monostatic or quasi-monostatic laser rangefinder, when the rangefinder has an optical outlet for emitting a laser beam of primary radiation and an optical inlet for collecting a portion of a return radiation, and when the optical inlet and outlet are juxtaposed or superimposed, with a center-to-center distance between emission and reception pupils which is zero or less than or equal to 100 mm. The method of the invention applies when the rangefinder is designed so that a direction of propagation of the primary radiation emitted by the optical outlet is identical to a direction of propagation of the portion of return radiation collected during a measurement operation of the rangefinder. The method comprises attaching an optical module in front of the optical outlet of the monostatic or quasi-monostatic laser rangefinder, so as to offset transversely the laser beam of primary radiation emitted by this optical outlet. The optical module used is such that the direction of propagation of the primary radiation downstream of the optical module is identical to the direction of propagation of the primary radiation between the optical outlet of the rangefinder and the optical module. In addition, the optical module is suitable for producing a transverse offset length that is between 10 cm (centimeter) and 35 cm, preferably between 15 cm and 20 cm, when measured perpendicularly to the direction of propagation.

For this purpose, the optical module of the invention comprises two reflector assemblies which are arranged on a path of the laser beam of primary radiation emitted by the rangefinder equipped with the optical module, downstream of the optical outlet of the rangefinder, such that the primary radiation is reflected by one and then the other of the two reflector assemblies. In addition, each reflector assembly is suitable for applying a deviation to the laser beam of primary radiation, and the respective deviations applied by one and then by the other of the two reflector assemblies are opposite to one another.

Thus, an optical module which is used to produce the protection function in accordance with the invention has a simple optical structure, this structure possibly limited to the two reflector assemblies maintained in suitable positions.

Moreover, since the deviations that are applied to the primary radiation beam by one and then by the other of the reflector assemblies are opposite to one another, the optical module can be adapted so that the parallelism between the directions of propagation of the primary radiation beam upstream and downstream of the optical module is not altered by tilting this module about at least one axis.

The optical module, when attached to a monostatic or quasi-monostatic laser rangefinder, therefore has the effect of transversely offsetting the emission pupil for primary radiation, away from the reception pupil for return radiation. Then, when the target retroreflects the primary radiation while producing only a small angular dispersion, for example such as a reflecting target which has the shape of a re-entrant cube corner, the power of the return radiation is mainly contained within a beam of a cross-sectional area barely larger than the size of the emission pupil of the rangefinder, and this return radiation is sent towards the optical inlet of the module. However, due to the invention, it is offset transversely relative to the optical inlet of the rangefinder, so that the optical inlet is located outside the main portion of the beam of the return radiation. The power of the portion of the return radiation that is collected, and thus received by the optical sensor of the rangefinder, is then reduced to an extent that is sufficient to prevent damage to the optical sensor.

In addition, given the cross-sectional dimensions of the primary radiation laser beam, the value of the transverse offset, between 10 cm and 35 cm, is sufficient to ensure protection of the optical sensor of the rangefinder, whether it is monostatic or quasi-monostatic. According to the invention, this value of the transverse offset is produced by an optical module which itself can have small dimensions and occupy a limited volume. In other words, the optical module used in the invention transforms the monostatic or quasi-monostatic rangefinder into a bistatic rangefinder in the meaning of the types of rangefinders listed above, but without the general disadvantages of bistatic rangefinders.

In general, the two reflector assemblies can be selected so that it is not necessary to precisely adjust one or two angle(s) of orientation of the optical module assembly relative to the rangefinder, while retaining identical the propagation directions for the primary radiation upstream and downstream of the optical module. The optical module can thus be attached to the rangefinder simply and quickly.

Advantageously, each reflector assembly may be adapted to apply to the primary radiation laser beam a deviation that is substantially independent of at least one angle of orientation of this reflector assembly. "Substantially independent deviation" is understood to mean that a first order derivative of the deviation which is applied to the primary radiation laser beam by the reflector assembly considered, with respect to the angle of orientation of this reflector assembly, is zero. In other words, the reflector assemblies can be selected so that it is not necessary to precisely adjust one or two angle(s) of orientation of each reflector assembly, which reduces the design and assembly costs of the optical module.

In general, for the invention, the optical module used may advantageously be further arranged so as not to offset transversely the portion of the return radiation that is collected by the rangefinder during a measurement operation.

In first embodiments of the invention, each reflector assembly of the optical module used may comprise a portion of a material that is transparent to to the primary radiation, this portion having three reflecting flat faces arranged in superposition with areas of three respective faces of a cube, distributed around a vertex of this cube. Thus, when the optical module is attached in front of the optical outlet of the rangefinder, each reflector assembly reverses the direction of propagation of the primary radiation while remaining along the same direction of propagation, but producing an elementary transverse offset of the laser beam of primary radiation. The effective transverse offset for the laser beam of primary radiation between the downstream of the optical module and a gap between the optical outlet of the rangefinder and the optical module, is then a vector addition of the elementary transverse offsets produced by the two reflector assemblies. Advantageously, each portion of the transparent material may have a bar shape, with a first longitudinal end of the bar comprising a reflecting flat face, and with a second longitudinal end of the bar, opposite to the first longitudinal end, comprising a right-angle reflecting dihedron, with an edge of this dihedron being perpendicular to the reflecting flat face of the first longitudinal end of the bar. In other words, each reflector assembly may be in the form of a bar which is inscribed within a corner of a re-entrant cube. Each reflector assembly of these first embodiments of the invention can then be called a cube-corner-bar.

In second embodiments of the invention, each reflector assembly of the optical module used may comprise an optical square based on a pentaprism which has two reflecting flat faces, such that when the optical module is attached in front of the optical outlet of the rangefinder, each reflector assembly applies a right-angle deflection to the direction of propagation of the primary radiation. For such second embodiments of the invention, a mechanical connection between the two reflector assemblies is preferably rigid or non-deformable.

In third embodiments of the invention, each reflector assembly may be a planar mirror, and the optical module is arranged so that the two planar mirrors are parallel. Then, the identical directions of propagation of the primary radiation upstream of the two planar mirrors and downstream of them is not altered if the orientation of the two mirrors is modified while they remain parallel to one another. In particular, the optical module may comprise a rhombohedron of transparent material, of which two opposite faces are reflecting so as to produce reflections of the primary radiation which are internal to the rhombohedron of transparent material. Thus, each of the two reflecting faces of the rhombohedron forms one of the two reflector assemblies. Preferably, a corner angle of at least some of the faces of the rhombohedron may be between 40° (degree) and 50°, in particular equal to 45°.

In addition, one of the following features may advantageously be applied in improvements of the invention, alone or in combinations of one or more:

each reflecting flat face of the reflector assemblies of the optical module used may have a surface area that is less than 9 cm$^2$, preferably less than 4 cm$^2$. The optical module can thus be of small dimensions and be compact;

the optical module used may further comprise at least one Risley prism, which is able to compensate for a lack of identical directions of propagation of the primary radiation downstream of the optical module and of the primary radiation in the gap between the optical outlet of the rangefinder and the optical module, when the optical module is attached in front of the optical outlet of the rangefinder; and the optical module used may further comprise removable attachment means which are suitable for removably attaching the optical module on the monostatic or quasi-monostatic laser rangefinder, such that the attached optical module is effective for the laser beam of primary radiation emitted by the optical outlet of the rangefinder.

The rangefinder assembly obtained, comprising the laser rangefinder and the optical module attached in front of its optical outlet, may be integrated into an optical sighting assembly, an optical pointing assembly, an optical target designation assembly, or a multi-sensor head which is intended for characterizing an environment.

Other features and advantages of the invention will be apparent in the following description of some examples of non-limiting embodiments, with reference to the appended drawings in which:

FIGS. 1a to 1c, already described, illustrate a distinction between three types of rangefinders: monostatic, quasi-monostatic, and bistatic;

Figure 2:
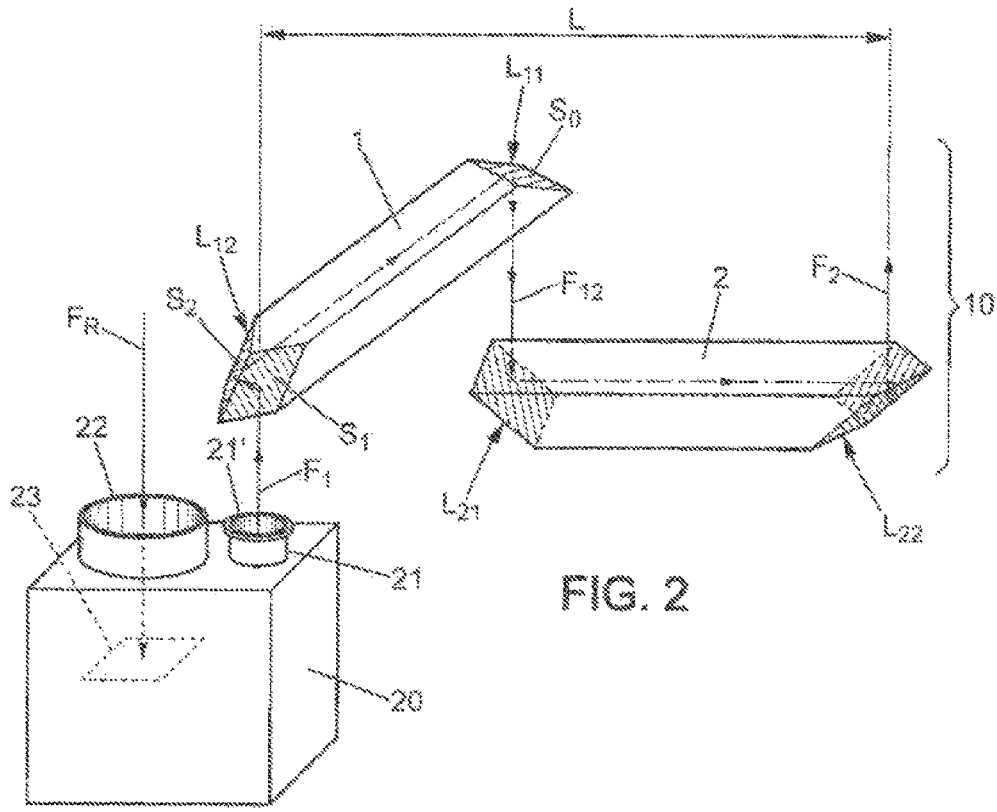
FIG. 2 is a perspective view of an optical module that can be used in a first embodiment of the invention.

FIG. 4 corresponds to FIG. 2 for a second embodiment of the invention;

FIG. 5 corresponds to FIG. 2 for a third embodiment of the invention; and

Figure 6A:
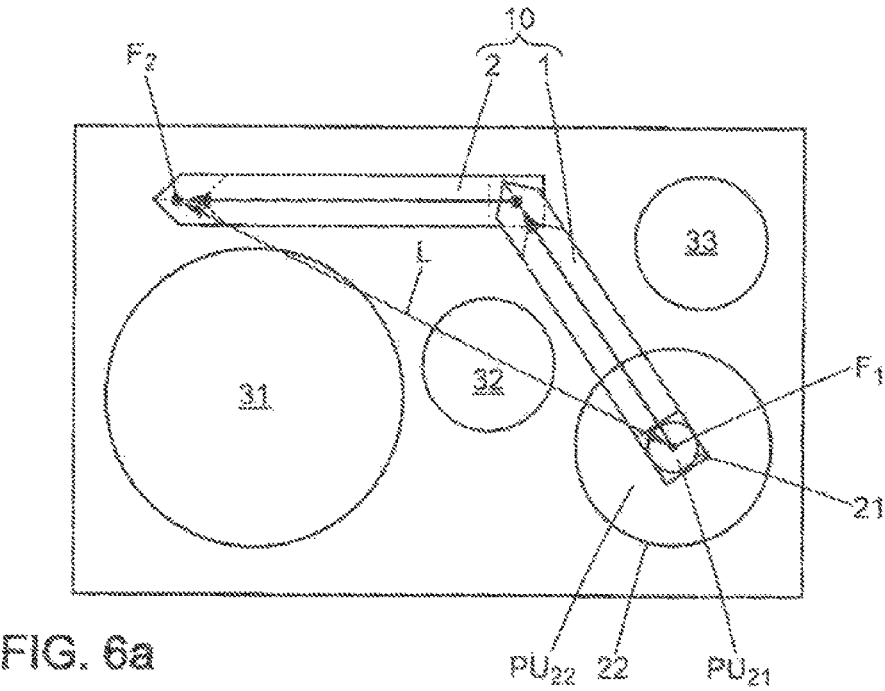
Figure 6B:
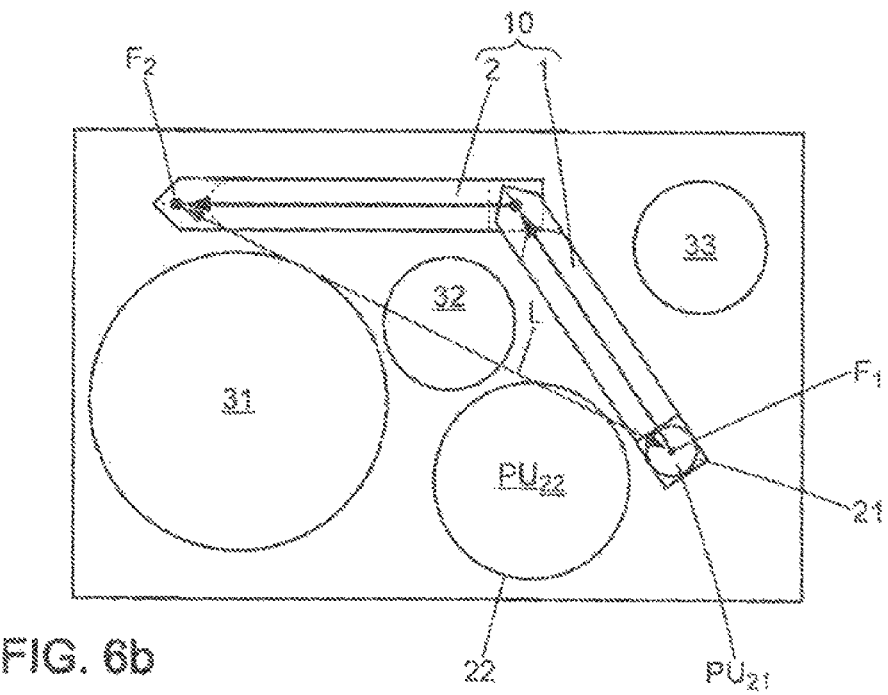

FIGS. 6a and 6b show two examples of using the invention.

For the sake of clarity, the dimensions of the elements represented in these figures do not correspond to actual dimensions nor to actual dimension ratios. In addition, identical references indicated in different figures designate identical elements or those which have identical functions.

Figure 1A:
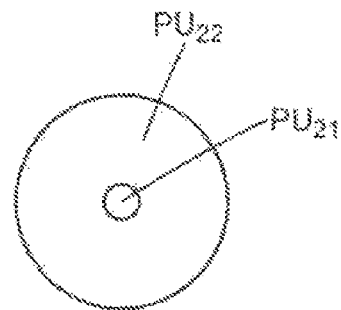
Figure 1B:
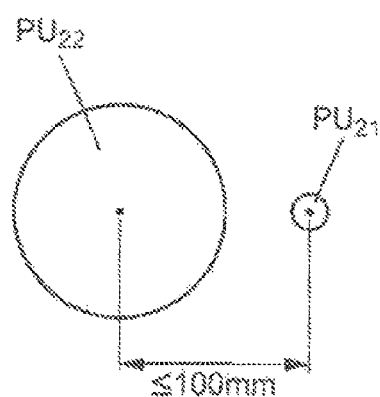
Figure 1C:
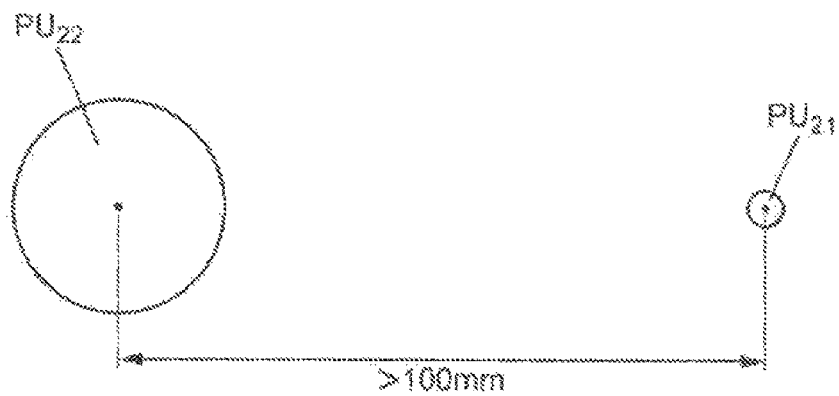

In accordance with FIG. 2, a quasi-monostatic laser rangefinder 20 comprises an optical outlet for laser radiation 21 as well as an optical inlet 22 which is in juxtaposition with the optical outlet 21. Such a quasi-monostatic rangefinder is in accordance with FIG. 1b. A monostatic rangefinder 20 may be used in an equivalent manner, where the optical outlet 21 and the optical inlet 22 are superimposed as shown in FIG. 1a. The rangefinder 20 is designed to produce a laser beam $F_1$, called the primary radiation laser beam, through the optical outlet 21. The beam $F_1$ has a parallel beam structure, and may have a wavelength which is between 0.360 μm (micrometers) and 3 μm, for example equal to 1.5 μm, with a beam diameter that is less than 12 mm (millimeters), for example. In this case, the optical outlet 21 may have transverse dimensions that are less than 15 or 20 mm.

The optical inlet 22 is intended to collect a portion FR of the radiation of the laser beam $F_1$, after propagation of the beam $F_1$ all the way to a target (not shown), backscattering by the target, and propagation back from the target to the optical inlet 22. FR was called the return radiation in the general part of this description. A distance between the respective optical axes of the pupils of the optical outlet 21 and optical inlet 22 is therefore less than or equal to 100 mm. Such operation of a monostatic or quasi-monostatic laser rangefinder, in order to provide a measurement of the distance of the target from the rangefinder, is known to those skilled in the art. In general, due to the fact that the backscattering of the beam $F_1$ by the target is distributed across a large solid angle, and/or because the backscattering by the target is accompanied by absorption, the power of the portion of the return radiation FR which is collected by the optical inlet 22 of the rangefinder 20 is much lower than that of the laser beam $F_1$. For this reason, the optical inlet 22 generally has a cross-sectional area which is greater than that of the optical outlet 21. Reference 23 designates an optical sensor which is used inside the rangefinder 20, downstream of the optical outlet 22, for detecting the collected portion of the return radiation FR.

However, in some situations, the reflection of the laser beam $F_1$ on the target can be intense, and precisely directed towards the optical outlet 21 of the rangefinder 20. This is the particular case when the target is a reflecting re-entrant cube corner. The radiation power received by the sensor 23 is then very significant, such that the sensor 23 could be damaged. But in such situations, the return radiation FR forms a quasi-parallel or parallel beam which has a reduced cross-sectional area. Offsetting the optical outlet 21 from the optical inlet 22 is sufficient to eliminate most of the risks of damage to the detector 23. An offset length comprised between 10 cm and 35 cm, and possibly between 15 cm and 20 cm, is sufficient. Those skilled in the art will understand that offsetting the optical outlet 21 from the optical inlet 22 means moving the effective emission pupil and the reception pupil of the rangefinder 20 apart from each other.

To achieve this, two reflector assemblies, respectively designated by the references 1 and 2, are combined in an optical module 10 intended to be mounted in front of the optical outlet 21, in order to displace transversely the effective emission pupil of the laser beam $F_1$ so that it is moved away from the optical inlet 22. Preferably, the optical module 10 does not affect the portion of the return radiation FR which is collected by the optical inlet 22.

According to a first embodiment of the invention which is illustrated in FIG. 2, each reflector assembly 1, 2 may be formed by a reflecting and re-entrant cube corner. In this case, the primary radiation laser beam $F_1$ is reflected by each reflector assembly 1, 2 in parallel to itself, while reversing the orientation of its direction of propagation. The two reflector assemblies 1 and 2, combined so as to reflect the laser beam $F_1$ one after the other, send on this laser beam $F_1$ again in parallel to the direction of propagation that it had between the optical outlet 21 of the rangefinder 20 and the module 10, and with the same orientation of the direction of propagation. However, each reflector assembly 1, 2 offsets the emission pupil of the beam $F_1$, and the total offset of this emission pupil results from vector addition of the two component offsets that are respectively produced by reflector assembly 1 and reflector assembly 2. In the figure, L denotes the total length of the offset.

Figure 3:
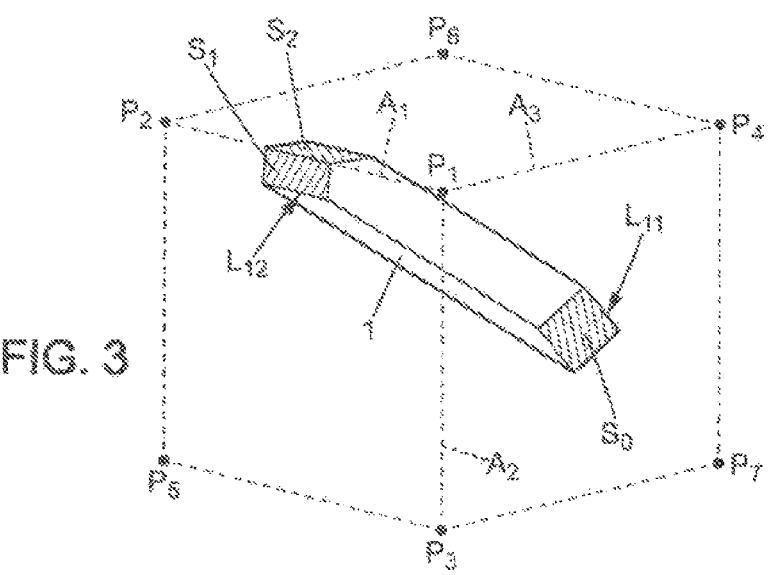
FIG. 3 illustrates the geometrical design principles of a reflector assembly as used in the embodiment of FIG. 2.

According to a preferred embodiment of the invention, each reflector assembly 1, 2 may consist of a rectilinear bar of transparent material, for example glass, whose end faces can be superimposed on three faces of a cube that are adjacent to the same vertex of the cube. FIG. 3 shows the principle of such a superposition for reflector assembly 1. $P_1, P_2, \ldots, P_7$ denote seven visible vertices of the cube, and $A_1, A_2$ and $A_3$ denote the three edges of the cube which meet at vertex $P_1$. The bar of the reflector assembly 1 may have any cross-section, but preferably with a flat side face which constitutes both the entrance face and the exit face for the laser beam $F_1$ in the bar. A first longitudinal end $L_{11}$ of the bar may consist of a flat face $S_0$ which can be superimposed on a portion of face $P_1P_3P_7P_4$ of the cube, and the other longitudinal end $L_{12}$ of the bar may straddle edge $A_1$, between vertices $P_1$ and $P_2$. Longitudinal end $L_{12}$ of the bar is thus constituted by a flat face $S_1$ which is superimposed on a portion of face $P_1P_2P_5P_3$ of the cube, and also by another flat face $S_2$ which is superimposed on a portion of face $P_1P_2P_6P_4$ of the cube. In other words, faces $S_1$ and $S_2$ form a right-angle dihedron, with an edge of this dihedron which is perpendicular to face $S_0$. The end faces $S_0$, $S_1$ and $S_2$ are advantageously metallized in order to be reflecting to the primary radiation. Then, if the laser beam $F_1$ enters the glass bar of the reflector assembly 1 through one of its side faces, by reflecting on one and then the other of the two faces $S_1$ and $S_2$ of end $L_{12}$, internally within the bar, it can propagate longitudinally in the glass bar until reflected by face $S_0$ of end $L_{11}$ before emerging through the same side face as that of its entrance. In addition, refraction deviations which affect the laser beam $F_1$ at its entrance into the glass to bar and at its exit from the same bar, may be opposite to one another so that the direction of propagation of the laser beam $F_1$ is not changed between before its entrance into and after its exit from the bar, except that the orientation of the direction of propagation of the laser beam $F_1$ is reversed. The length of the glass bar determines that of the offset between the effective exit pupil for the laser beam $F_1$ after reflector assembly 1, and the emission pupil of the optical outlet 21. The skilled person will understand that the reflector assembly 1 just described can be inverted, so that the laser beam $F_1$ enters the glass bar to be first reflected by end face $S_0$, then propagates longitudinally in the glass bar and is then reflected by end faces $S_1$ and $S_2$ before emerging from the glass bar.

It is known that reversing the orientation of the direction of propagation of the laser beam $F_1$ along a same direction of propagation, as just described for the use of a glass bar from end $L_{12}$ towards end $L_{11}$, or from end $L_{11}$ towards end $L_{12}$, is obtained regardless of the angular orientation of the bar as long as the laser beam $F_1$ remains inside the bar between its two ends. In other words, reversing the orientation of the direction of propagation of the laser beam $F_1$ along its initial direction of propagation is independent of two polar coordinate angles which define the longitudinal orientation of the bar, when each of the two angles varies within an interval of non-zero width.

Reflector assembly 2 may have a similar composition: it may consist of another cube-corner glass bar, of which one end $L_{21}$ may be formed by a portion of a face of the cube, and the other end $L_{22}$ may be straddling an edge of the cube. In FIG. 2, $F_1$ denotes the primary radiation laser beam in the gap between the optical outlet 21 of the rangefinder 20 and reflector assembly 1, $F_{12}$ denotes the same laser beam but between the two reflector assemblies 1 and 2, and $F_2$ denotes the same laser beam after having been reflected by reflector assembly 2. The respective longitudinal directions of the two glass bars of the reflector assemblies 1 and 2 may form any angle between them, in projection in a plane perpendicular to laser beam $F_1$. In addition, the two reflector assemblies 1 and 2 may be spaced apart from each other by any distance along beam $F_{12}$.

We repeat here that an advantage of the embodiment of the invention which has just been described in relation to FIGS. 2 and 3 lies in the fact that no angular alignment is necessary for the two reflector assemblies 1 and 2, whether with respect to each other or with respect to the direction of emission of the laser beam $F_1$ at the optical outlet 21 of the rangefinder 20. In fact, generally speaking for this type of implementation of the invention which is based on a geometry of re-entrant and reflecting cube corners, the deviations of the laser beam which are produced by the two reflector assemblies 1 and 2, are each equal to 180° in absolute value, and therefore are automatically opposite in their direction of orientation.

FIG. 4 corresponds to FIG. 2 when each of the reflector elements 1 and 2 consists of a pentaprism of transparent material, for example glass. A pentaprism is an optical component designed to deviate a light beam by a right angle, well known to those skilled in the art and belonging to the category of components called optical squares. Each pentaprism has a flat entrance face, two reflecting flat faces denoted $S'_1$ and $S'_2$, and a flat exit face, in the order of the faces along the path of the laser beam $F_1$. Preferably, the reflecting flat faces $S'_1$ and $S'_2$ are metallized to increase the intensity of each internal reflection of laser beam $F_1$. Each of the two pentaprisms which form the reflector elements 1 and 2 deviates the primary radiation laser beam $F_1$ by 90° (degrees), one after the other. In FIG. 4, $D_1$ and $D_2$ denote the deviations of the laser beam $F_1$ which are respectively produced by the two pentaprisms, each equal to 90° in absolute value but opposite in their directional orientation. Also in known manner, each deviation $D_1$ or $D_2$ of the laser beam $F_1$ which is produced by one of the pentaprisms is independent, to the first order, of an angle of orientation of this pentaprism about a direction denoted D which is simultaneously parallel to the two reflecting flat faces of the pentaprism. "First order" means that the deviation of the laser beam $F_1$ varies little around the value 90° when the orientation of the pentaprism about direction D varies to a limited extent to either side of the orientation by which the laser beam $F_1$ perpendicularly crosses each of the entrance and exit faces of this pentaprism. More precisely, the derivative of the deviation of the laser beam $F_1$ which is produced by the pentaprism, with respect to the orientation of this pentaprism around the direction D, is zero when the deviation is equal to 90°.

However, the parallelism between laser beam $F_1$, as it exists in the gap between the optical outlet 21 of the rangefinder 20 and reflector assembly 1, and laser beam $F_2$, as the latter exists downstream of reflector assembly 2, can be altered by an error in orientation of at least one of the pentaprisms, especially such an error in orientation about a direction other than direction D. To compensate for such an error, it is possible to add a Risley prism 3 inside the optical module 10, preferably between reflector assemblies 1 and 2, but also possibly upstream of reflector assembly 1 or downstream of reflector assembly 2. In a manner which is also known to those skilled in the art, the Risley prism 3 comprises two adjacent transparent wedges 3a and 3b, each of them having two opposite faces which between them form an angle which is small but not zero, for example between 0.1° and 1.5°, the two wedges having the same angle value. The orientation of each of the wedges of the Risley prism 3 about the laser beam enables compensating for an angular misalignment of at least one of the two pentaprisms, and more generally of at least one of the two reflector assemblies 1 and 2.

FIG. 5 corresponds to FIG. 2 for embodiments of the invention where the optical module 10 comprises two parallel planar mirrors 1 and 2. For example, to ensure that the two planar mirrors 1 and 2 remain parallel, they may be formed by two opposite faces of a rhombohedron 4 of solid transparent material. These two opposite faces may be made reflecting by metallization or by deposition of stacks of multiple dielectric layers. A corner angle α of some of the side faces of the rhombohedron 4, which are located between the opposite reflecting faces, may be equal to 45°. The laser beam $F_1$ of primary radiation then enters the rhombohedron 4 by one of the side faces thereof, called the entrance face, and is then reflected by mirror-face 1 inside the rhombohedron 4. It then propagates towards mirror-face 2 within the transparent material of the rhombohedron 4, in the form of the intermediate beam $F_{12}$, then is reflected by mirror-face 2 still inside the rhombohedron 4, and leaves the rhombohedron 4 by another side face thereof, which is opposite to the entrance side face, forming laser beam $F_2$ which is parallel to beam $F_1$. Mirror-faces 1 and 2 have sufficient areas, preferably greater than 1.0 cm², to reflect a major portion of the energy of laser beam $F_1$ as a function of the cross-sectional area of this beam. In addition, the direction of propagation of laser beam $F_2$ remains identical to that of laser beam $F_1$ when the rhombohedron 4 is tilted about any axis.

For the three embodiments just described with reference to FIGS. 2, 4, and 5 respectively, the reflector elements 1 and 2 have sufficient cross-sectional areas to transmit a main portion of the energy of laser beam $F_1$. For this, reflecting flat faces that have areas greater than 1.0 cm² may be sufficient, depending on the cross-sectional area of laser beam $F_1$.

The two reflector assemblies 1 and 2, and possibly also the Risley prism 3, are held in fixed relative positions inside the module 10. Advantageously, the module 10 and/or the outlet 21 of the rangefinder 20 may be equipped with at least one assembly ring 21' upstream of reflector assembly 1, which is suitable for removably mounting the module 10 on the rangefinder 20, in front of the optical outlet 21. The monostatic or quasi-monostatic laser rangefinder 20 which is thus equipped with the optical module 10 has been called a rangefinder assembly in the general part of the present description. It is also possible for the module 10 to be attached to the monostatic or near-monostatic laser rangefinder 20 within the rangefinder device, in other words without the possibility of disassembly. In this case, the connection between the module 10 and the optical outlet 21 can be simplified.

Optionally, a rangefinder assembly as obtained by a method according to the invention can be incorporated into a multi-sensor head which is intended to characterize an environment. The multi-sensor head assembly can then be mounted on a direction-adjustable support, with the optical inlets, optical outlets, and detection windows of the sensors grouped together in a usable area of the head which is limited. In this case, it may be advantageous to use an implementation of the invention of the type in FIG. 2, and in which a non-zero angle between the longitudinal directions of the two glass bars makes it possible to place the module 10 in the usable area of the multi-sensor head without obscuring an optical inlet, an optical outlet, or a detection window of any sensor. FIG. 6a shows a monostatic rangefinder 20 which is in accordance with FIG. 1a and which is provided with the optical module 10 according to FIG. 2. Similarly, FIG. 6b shows a quasi-monostatic rangefinder 20 which is in accordance with FIG. 1b and which is also provided with the optical module 10 of FIG. 2. In these FIGS. 6a and 6b, and by way of example, references 31, 32 and 33 designate to the reception pupils of an infrared sensor, of a visible radiation sensor with a wide angle of view, and of a visible radiation sensor with telephoto lens, which are not obscured by the optical module 10. The offset length L between beams $F_1$ and $F_2$ is also indicated in these two figures.

It is understood that the invention may be reproduced by adapting or modifying secondary aspects thereof with respect to the embodiments detailed above, while retaining some of the aforementioned advantages. Recall that the main advantage is to provide protection of the monostatic or quasi-monostatic laser rangefinder against specular retroreflection of the primary radiation laser beam by a target, where the return beam would be superimposed on the primary radiation laser beam.

The invention claimed is:

1. A method for protecting a monostatic or quasi-monostatic laser rangefinder, said rangefinder having an optical outlet for emitting a laser beam of primary radiation and an optical inlet for collecting a portion of a return radiation, the optical inlet and outlet being juxtaposed or superimposed, with a center-to-center distance between the emission and reception pupils that is zero or less than or equal to 100 mm, and the rangefinder being designed so that a direction of propagation of the primary radiation emitted by the optical outlet is identical to a direction of propagation of the portion of return radiation collected during a measurement operation of the rangefinder, the method comprising attaching an optical module in front of the optical outlet of the rangefinder, so as to offset transversely the laser beam of primary radiation, the optical module being such that a direction of propagation of the primary radiation downstream of the optical module is identical to a direction of propagation of said primary radiation between the optical outlet of the rangefinder and said optical module, with a transverse offset length that is between 10 cm and 35 cm, preferably between 15 cm and 20 cm, measured perpendicularly to the direction of propagation, said optical module comprising two reflector assemblies which are arranged on a path of the laser beam of primary radiation emitted by the rangefinder equipped with the optical module, downstream of the optical outlet of the rangefinder, such that the primary radiation is reflected by one and then the other of the two reflector assemblies, each reflector assembly being suitable for applying a deviation to the laser beam of primary radiation, and the respective deviations applied by one and then by the other of the two reflector assemblies being opposite to one another.

2. The method of claim 1, wherein the optical module is further arranged so as not to offset transversely the portion of the return radiation that is collected by the rangefinder during the measurement operation of said rangefinder, said return radiation resulting from a backscattering or retroreflection of the primary radiation by a target distant from the rangefinder.

3. The method of claim 1, wherein each reflector assembly of the optical module comprises a portion of a material that is transparent to the primary radiation, said portion having three reflecting flat faces arranged in superposition with areas of three respective faces of a cube, distributed around a vertex of the cube, so that when the optical module is attached in front of the optical outlet of the rangefinder, each reflector assembly reverses the direction of propagation of the primary radiation while remaining along the same direction of propagation, but producing an elementary transverse offset of the laser beam of primary radiation, the effective transverse offset for said laser beam of primary radiation between the downstream of the optical module and a gap between the optical outlet of the rangefinder and said optical module, being a vector addition of the elementary transverse offsets produced by the two reflector assemblies.

4. The method of claim 2, wherein each reflector assembly of the optical module comprises a portion of a material that is transparent to the primary radiation, said portion having three reflecting flat faces arranged in superposition with areas of three respective faces of a cube, distributed around a vertex of the cube, so that when the optical module is attached in front of the optical outlet of the rangefinder, each reflector assembly reverses the direction of propagation of the primary radiation while remaining along the same direction of propagation, but producing an elementary transverse offset of the laser beam of primary radiation, the effective transverse offset for said laser beam of primary radiation between the downstream of the optical module and a gap between the optical outlet of the rangefinder and said optical module, being a vector addition of the elementary transverse offsets produced by the two reflector assemblies.

5. The method of claim 3, wherein each portion of the transparent material has a bar shape, with a first longitudinal end of the bar comprising a reflecting flat face, and with a second longitudinal end of the bar, opposite to said first longitudinal end, comprising a right-angle reflecting dihedron, with an edge of said dihedron being perpendicular to the reflecting flat face of the first longitudinal end of the bar.

6. The method of claim 1, wherein each reflector assembly of the optical module comprises an optical square based on a pentaprism which has two reflecting flat faces, such that when the optical module is attached in front of the optical outlet of the rangefinder, each reflector assembly applies a right-angle deflection to the direction of propagation of the primary radiation.

7. The method of claim 2, wherein each reflector assembly of the optical module comprises an optical square based on a pentaprism which has two reflecting flat faces, such that when the optical module is attached in front of the optical outlet of the rangefinder, each reflector assembly applies a right-angle deflection to the direction of propagation of the primary radiation.

8. The method of claim 1, wherein each reflector assembly of the optical module is a planar mirror, and the optical module is arranged so that the two planar mirrors are parallel.

9. The method of claim 2, wherein each reflector assembly of the optical module is a planar mirror, and the optical module is arranged so that the two planar mirrors are parallel.

10. The method of claim 8, wherein the optical module comprises a rhombohedron of transparent material, of which two opposite faces are reflecting so as to produce reflections of the primary radiation which are internal to the rhombohedron of transparent material, each of the two reflecting faces of the rhombohedron forming one of the two reflector assemblies.

11. The method of claim 1, wherein each reflecting flat face of the reflector assemblies of the optical module has a surface area that is less than 9 $cm^2$, preferably less than 4 $cm^2$.

12. The method of claim 1, wherein the optical module further comprises at least one Risley prism able to compensate for a lack of identical directions of propagation of the primary radiation downstream of the optical module and of said primary radiation in the gap between the optical outlet of the rangefinder and said optical module, when the optical module is attached in front of the optical outlet of the rangefinder.

13. The method of claim 1, wherein the optical module further comprises removable attachment means which are suitable for removably attaching the optical module on the monostatic or quasi-monostatic laser rangefinder, such that the attached optical module is effective for the laser beam of primary radiation emitted by the optical outlet of the rangefinder.

14. The method of claim 1, wherein the laser rangefinder and the optical module attached in front of the optical outlet of said laser rangefinder, are comprised in a rangefinder assembly, said rangefinder assembly being integrated into an optical sighting assembly, an optical pointing assembly, an optical target designation assembly, or a multi-sensor head intended for characterizing an environment.

* * * * *